United States Patent
Ciampini et al.

(10) Patent No.: US 12,110,406 B1
(45) Date of Patent: Oct. 8, 2024

(54) ACTIVE ENERGY RAY CURABLE WATER-BASED INKJET INKS AND PRINTHEADS

(71) Applicant: SICPA HOLDING SA, Prilly (CH)

(72) Inventors: Davide Ciampini, Pavone Canavese (IT); Paolo Boggio, Turin (IT)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 18/571,002

(22) PCT Filed: Jun. 15, 2022

(86) PCT No.: PCT/EP2022/066301
§ 371 (c)(1),
(2) Date: Dec. 15, 2023

(87) PCT Pub. No.: WO2022/263509
PCT Pub. Date: Dec. 22, 2022

(30) Foreign Application Priority Data

Jun. 16, 2021 (EP) ..................................... 21179896

(51) Int. Cl.
*C09D 11/38* (2014.01)
*B41J 2/14* (2006.01)
(Continued)

(52) U.S. Cl.
CPC ........... *C09D 11/38* (2013.01); *B41J 2/14016* (2013.01); *B41M 7/0081* (2013.01); *C09D 11/101* (2013.01); *C09D 11/107* (2013.01)

(58) Field of Classification Search
CPC ..... C09D 11/38; C09D 11/101; C09D 11/107; B41J 2/14016; B41M 7/0081
(Continued)

(56) References Cited

U.S. PATENT DOCUMENTS

| 2009/0136680 | A1 | 5/2009 | Kishi et al. | |
| 2016/0039851 | A1* | 2/2016 | Müller | C07F 9/34 |
| | | | | 522/63 |
| 2020/0206091 | A1* | 7/2020 | Nojiri | C08K 5/5313 |

FOREIGN PATENT DOCUMENTS

| EP | 0189622 | 8/1986 |
| EP | 2960306 | 12/2015 |

(Continued)

OTHER PUBLICATIONS

International Search Report and Written Opinion issued with respect to application No. PCT/EP2022/066301.

*Primary Examiner* — Betelhem Shewareged
(74) *Attorney, Agent, or Firm* — Muncy, Geissler, Olds & Lowe, P.C.

(57) ABSTRACT

The present application is related to an active energy ray radically curable inkjet printing ink comprising water, a radically curable di(meth)acrylate monomer, a radically curable (meth)acrylate compound, a photoinitiator of formula (I):

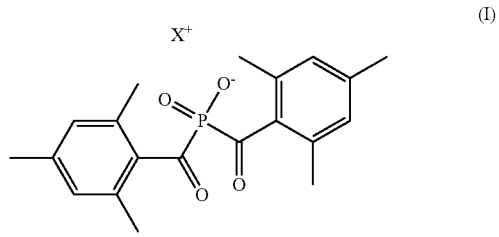

wherein X+ is Na+ or Li+, preferably Na+, and one or more co-initiator.

(Continued)

The application also relates to a printed feature consisting of a cured ink layer, a document comprising said printed feature, a thermal inkjet printhead comprising said ink and a process for printing a feature made of said ink on a substrate.

20 Claims, 2 Drawing Sheets

(51) Int. Cl.
  *B41M 7/00* (2006.01)
  *C09D 11/101* (2014.01)
  *C09D 11/107* (2014.01)

(58) Field of Classification Search
  USPC .......................................................... 428/209
  See application file for complete search history.

(56) References Cited

FOREIGN PATENT DOCUMENTS

| | | |
|---|---|---|
| EP | 3460013 | 3/2019 |
| WO | 2013096587 | 6/2013 |

* cited by examiner

ACTIVE ENERGY RAY CURABLE WATER-BASED INKJET INKS AND PRINTHEADS

FIELD OF THE INVENTION

The present application is in the field of inkjet inks and printheads. The application pertains generally to an active energy ray curable water-based inkjet printing ink. The application also relates to a thermal inkjet printhead comprising said ink.

BACKGROUND OF THE INVENTION

Active energy ray radically curable inks are cured by free radical mechanisms consisting of the activation of one or more photoinitiators able to liberate free radicals upon the action of active energy ray, in particular of UV light, which in turn initiate the polymerization so as to form a cured layer.

UV energy is usually provided by mercury lamps, in particular by medium-pressure mercury lamps. Mercury lamps require a high amount of energy, need efficient and costly heat dissipation systems, are prone to ozone formation and have a limited lifespan.

Recently, lamps and systems based on UV-LEDs have been developed for curing inks and coatings. On the contrary to medium-pressure mercury lamps that have emission bands in the UV-A, UV-B and UV-C regions of the electromagnetic spectrum, UV-LED lamps emit radiation in the UV-A region. Moreover, current UV-LED lamps emit quasi monochromatic radiation, i.e. only emit at one wavelength, such as 365 nm, 385 nm, 395 nm or 405 nm.

Traditionally, active energy ray inks are solvent-based inks; it means that every raw material is solvent soluble with all the technological consequences, well known in the art, connected to the use of solvent systems.

Solvent-based inks in inkjet field typically suffer from some critical issues: relative low reliability into inkjet printheads, flammability and health risk, chemical compatibility towards the printhead materials, unpleasant odor.

When solvent-based inks are used, it is possible to have migration of chemical species through the packaging. This may cause the chemical components of the inks to contact and stain food, causing a consumer to ingest hazardous components. These problems must be considered for human health and the environment.

Thus, there is a need in the art for an alternative to solvent-based inks. In order to solve the problems caused by the solvent-based ink, water-based active energy ray curable inks have been developed.

Water-based inks, such as those described in US2009136680, were developed.

While it is important to solve the aforementioned problems, water-based inks must present at least the same chemical, mechanical and technological performances of the solvent-based active energy ray inks once printed and crosslinked. More precisely, the developed inks must guarantee:

Good ejectability by thermal inkjet printhead, either monochromatic printheads or multiple inks printheads,
High reliability of the ink loaded into the proprietary thermal inkjet printhead,
High compatibility of the ink with different types of materials generally used to assembly the printhead (hydraulic glues, sponges, fibers, plastic reservoirs, photopolymer, etc.),
Good decap-time of the inks,
Low dry time of the inks onto the printed media,
High optical density,
Good adhesion once cured on different substrates (plastics, metals, papers . . . ),
High cross-linking density and conversion degree after irradiation,
Advantageous durability or chemical resistance (on porous and/or non-porous media),
Absence or limited presence of chemical substances migration (for example in food packaging or pharmaceutical packaging) to support good human health and environmental sustainability,
Time/temperature curing conditions compatible with the other parts of the print tool.

The inventors successfully formulated water-based inks which reached every criterion exposed previously. The aim to employ these formulations in every application field requires raw materials with specific requirements.

A first object of the present invention is an active energy ray radically curable inkjet printing ink which is water-based.

The described inks and printheads comprising said inks are the result of the fine-tuning of ingredients to achieve all the requirement of the end-use applications.

The present invention introduces water-based inks that, after irradiation with an active energy ray lamp, for example a LED lamp, guarantee a good adhesion onto the substrate. The correct emissions of energy by the lamp allow an efficient reticulation of the reactive moieties included into the ink recipe. The result is a printed ink of high durability, regardless of the substrate.

The innovative aspect of the invention is the ability of the developed formulations to reach water and solvent resistance once crosslinked. Furthermore, the use of appropriate pigment dispersions in the colored ink formulations avoids any discoloring due to contact with water and solvents like ethanol.

A second object of the invention is a printed feature consisting of a cured ink layer made from the active energy ray radically curable inkjet printing ink.

Furthermore, the invention relates to an article or document comprising a printhead substrate and one or more printed features according to the second object of the invention.

Another object of the invention is thermal inkjet printhead comprising the active energy ray radically curable inkjet printing ink according to the present invention.

Finally, the invention also relates to a process for printing a feature on a substrate by a thermal inkjet printing comprising a step of applying the active energy ray radically curable inkjet printing ink of the present invention.

SUMMARY OF THE INVENTION

Accordingly, it is an object of the present invention to overcome the deficiencies of the prior art.

This is achieved by the provision of an active energy ray radically curable inkjet printing ink comprising:
i) at least 55 wt. % of water,
ii) from about 2 wt. % to about 20 wt. % of a radically curable di(meth)acrylate monomer being a polyethylene glycol di(meth)acrylate having 5 or more ethylene oxide groups per molecule;
iii) from about 1 wt. % to about 15 wt. % of a radically curable (meth)acrylate compound being a hydroxyalkyl (meth)acrylate wherein the alkyl group is methyl, ethyl, propyl, butyl or isobutyl, preferably hydroxyalkyl (meth)acrylate wherein the alkyl group is methyl, ethyl, propyl, butyl or isobutyl;

iv) from about 1 wt. % to about 5 wt. % of a photoinitiator of formula (I):

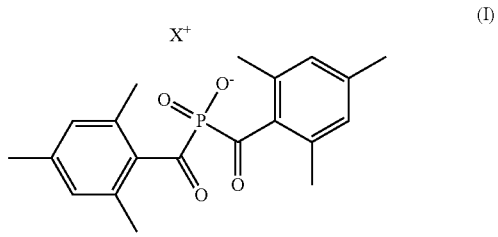

wherein X+ is Na+ or Li+, preferably Na+ v) from about 0.1 wt. % to about 2 wt. % of one or more co-initiator selected from the group consisting of N-[3-(dimethylamine)propyl]metacrylamide and/or poly(methylhydrosiloxane), the weight percentage being based on the total weight of the active energy ray radically curable inkjet printing ink.

Also described herein is a printed feature consisting of a cured ink layer made from the active energy ray radically curable inkjet printing ink described herein and an article or document comprising a substrate and one or more printed features described herein.

Also described herein is a thermal inkjet printhead comprising a printhead substrate; a nozzle layer, including a plurality of nozzles formed therethrough; a plurality of ink ejection chambers corresponding to the plurality of nozzles; a plurality of heater resistors formed on the printhead substrate and corresponding to the plurality of ink ejection chambers, each of the heater resistors being located in a different one of the ink ejection chambers so that ink drop ejection through each of the nozzles is caused by heating of one of the heater resistors that is located in the corresponding ink ejection chamber; and the active energy ray radically curable inkjet printing ink described herein.

Also described herein is a process for printing a feature on a substrate by a thermal inkjet printing process and features obtained thereof, the process comprising the steps of:

a) applying the active energy ray radically curable inkjet printing ink described herein by thermal inkjet printing so as to form an ink layer, preferably said step a) is carried out with the thermal inkjet printhead described herein, and b) exposing the ink layer to an active energy ray at a dose of at least 150 mJ/cm$^2$, to cure said ink layer with an active energy ray source.

DETAILED DESCRIPTION

Figure 1A:
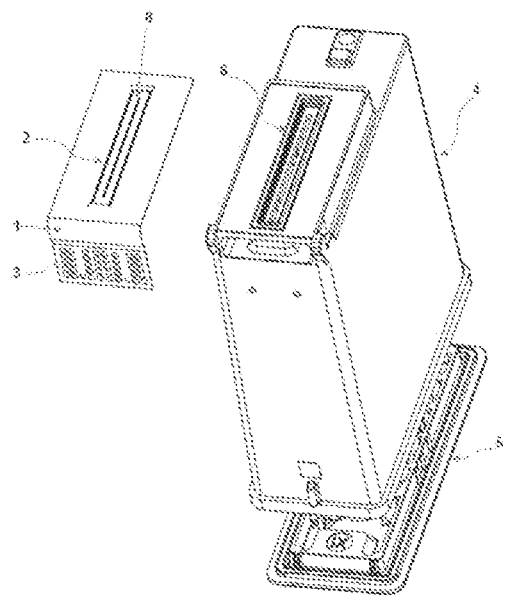
FIGS. 1A and 1B are schematic representations of a printhead cartridge compatible with the active energy ray radically curable inkjet printing ink of the invention.

The following definitions are to be used to interpret the meaning of the terms discussed in the description and recited in the claims.

As used herein, the term "about" means that the amount or value in question may be the specific value designated or some other value in its neighborhood. Generally, the term "about" denoting a certain value is intended to denote a range within ±10% of the value. As one example, the phrase "about 100" denotes a range of 100±10, i.e. the range from 90 to 110. Generally, when the term "about" is used, it can be expected that similar results or effects according to the invention can be obtained within a range of 105% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a coating composition comprising a compound A may include other compounds besides A. However, the term "comprising" also covers, as a particular embodiment thereof, the more restrictive meanings of "consisting essentially of" and "consisting of", so that for instance "a fountain solution comprising A, B and optionally C" may also (essentially) consist of A and B, or (essentially) consist of A, B and C.

The term "active energy ray" relates to energy rays such as electron beams, ultraviolet rays and infrared rays which affect the electron orbitals of the body being irradiated, thereby acting as a trigger for radical, cationic, or anionic or the like polymerization reactions. An "active energy ray-curable ink" describes an ink that forms a cured film upon irradiation with these types of active energy rays.

The term "UV" (ultraviolet) as used herein is intended to mean irradiation having a wavelength component in the UV part of the electromagnetic spectrum, typically from 200 nm to 420 nm.

The term "(meth)acrylate" in the context of the present invention refers to the acrylate as well as the corresponding methacrylate. Likewise, "di(meth)acrylate" refers to diacrylate as well as the corresponding dimethacrylate.

Where the present description refers to "preferred" embodiments/features, combinations of these "preferred" embodiments/features shall also be deemed as disclosed as long as this combination of "preferred" embodiments/features is technically meaningful.

The radically curable inks described herein are cured by free radical mechanisms consisting of the activation by energy of one or more photoinitiators which liberate free radicals which in turn initiate the polymerization.

The high amount of water in the ink prevents the strong evaporation from the nozzles, typical in solvent-based systems, which causes unreliability of the solvent-based inks.

In an embodiment of the invention, the active energy ray radically curable inkjet printing ink is a UV radically curable inkjet printing ink.

In an embodiment of the invention, the active energy ray radically curable inkjet printing ink of the invention is a LED radically curable inkjet printing ink.

More preferably, the active energy ray radically curable inkjet printing ink of the invention is a UV-LED radically curable inkjet printing ink, i.e. an ink that forms a cured film upon irradiation by a LED lamp which emits ultraviolet radiation, hereunder designated as "UV-LED lamp".

Whereas it is known in the art to use a high number of reactive functionalities per monomer to produce printed elements with good properties, the described diacrylate allows:

i) to maintain the viscosity under a certain critical value for a good ejectability and allows the production of high-quality printed elements,
ii) to limit evaporation of the ink in the chamber of the printhead during its life: the higher evaporation, the higher increase of viscosity.

The described di(meth)acrylate monomer having 5 or more ethylene oxide groups per molecule allows to avoid the precipitation of some components of the ink which would render it improper to its end-use.

The radically curable ink described herein further comprises from about 2 wt. % to about 20 wt. %, preferably from about 4 wt. % to about 15 wt. %, most preferably from about 5 wt. % to about 12 wt. % of a radically curable di(meth)acrylate monomer being a polyethylene glycol di(meth)acrylate having 5 or more ethylene oxide groups per molecule.

Preferably, the radically curable di(meth)acrylate monomer is a polyethylene glycol di(meth)acrylate having 7 or more ethylene oxide groups per molecule.

More preferably the radically curable di(meth)acrylate monomer is a polyethylene glycol di(meth)acrylate having 10 or more ethylene oxide groups per molecule.

In a preferred embodiment, said radically curable di(meth)acrylate monomer has a molecular weight comprised between about 300 and about 600 g/mol.

In the context of the invention, the best radically curable di(meth)acrylate monomer is the exemplified diacrylate (PEG Diacrylate having a number of ethoxylation of 10). This radically curable di(meth)acrylate monomer gives the ink the ability to viscosize upon water evaporation without increasing too much its base viscosity.

The radically curable ink described herein further comprises from about 1 wt. % to about 15 wt. %, preferably from about 2 wt. % to about 12 wt. %, most preferably from about 3 wt. % to about 9 wt. % of a radically curable (meth)acrylate compound being a hydroxyalkyl (meth)acrylate wherein the alkyl group is methyl, ethyl, propyl, butyl or isobutyl, preferably hydroxyalkyl (meth)acrylate wherein the alkyl group is methyl, ethyl, propyl, butyl or isobutyl.

The radically curable ink described herein further comprises from about 1 wt. % to about 5 wt. %, preferably from about 1.5 wt. % to about 4.5 wt. % most preferably from about 2.2 wt. % to about 3.8 wt. % of a photoinitiator of formula (I)

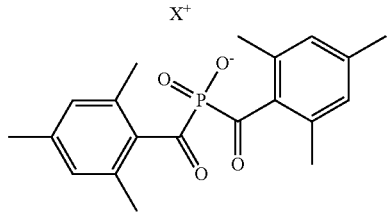

(I)

wherein X+ is Na+ or Li+, preferably Na+.

Said photoinitiator allows the ink of the invention to correctly cure without having to use an excessive amount of active ray energy.

In a preferred embodiment, the photoinitiator of formula (I) is BAPO-ONa.

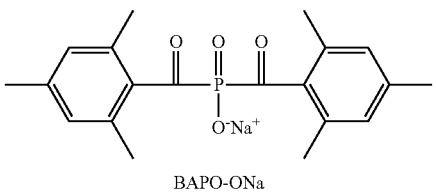

BAPO-ONa

The photoinitiators of formula (I) can be incorporated into the compositions according to the present invention in lower concentrations than photoinitiators of the prior art, which in turn reduces the risk associated with migration of unbound photoinitiator or photoinitiator decomposition products, even where low migration potential photoinitiators are employed.

This is particularly advantageous for UV-inkjet compositions because typically relatively high concentrations of photoinitiators are required to help overcome the effect of oxygen inhibition, which is an endemic problem associated with the UV-curing of inkjet compositions in air. It is quite common for UV-inkjet compositions to contain 8% w/w or more of photoinitiator blends to achieve the desired UV-cure response.

In particular, any photoinitiators used in the compositions according to the present invention preferably exhibit a migration of less than 10 ppb.

The migration potential of a given photoinitiator is measured according to the method set forth in EFSA Guideline—Note for guidance FCM evaluation 2008.08.07.

The migration potential of a given photoinitiator is measured at 60° C.

The radically curable ink described herein further comprises from about 0.1 wt. % to about 2 wt. % preferably from about 0.2 wt. % to about 1.5 wt. %, most preferably from about 0.2 wt. % to about 1.2 wt. % of one or more co-initiator selected from the group consisting of N-[3-(dimethylamine)propyl]metacrylamide and/or poly(methylhydrosiloxane).

The co-initiator selected from the group consisting of N-[3-(dimethylamine)propyl]metacrylamide and/or poly(methylhydrosiloxane) confers the ink a sufficient cross-linking degree, in turn granting the cured ink a sufficient water resistance.

In an embodiment of the invention, the active energy ray radically curable inkjet printing ink further comprises from about 1.0 wt. % to about 15 wt. % preferably from about 2 wt. % to about 12 wt. %, most preferably from about 3 wt. % to about 10 wt. % of a coloring agent, the weight percentage being based on the total weight of the active energy ray radically curable inkjet printing ink.

Said coloring agents described herein comprises pigments and/or dyes.

Colored inks formulations (i.e. comprising one or more coloring agents, i.e. one or more pigments and/or dyes) described herein might be used to print images and/or colored texts on different types of material, guaranteeing an excellent durability over the time onto the printed support.

The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

Said coloring agents are preferably dispersed in a mixture comprising one or more mono(meth)acrylate monomers and/or one or more di(meth)acrylate monomers and/or one or more tri(meth)acrylate monomers prior to their incorporation in the ink.

Alternatively, active energy ray radically curable inkjet printing ink lacking coloring agents might be used to print images and/or texts and can be optionally used as a cover to protect images or texts printed by colored or black inks.

In an embodiment, the active energy ray radically curable inkjet printing ink further comprises from about 0.05 wt. % to about 2 wt. % preferably from about 0.1 wt. % to about 1.8 wt. %, most preferably from about 0.15 wt. % to about 1.5 wt. % of a non-ionic fluorinated surfactant the weight percentage being based on the total weight of the active energy ray radically curable inkjet printing ink.

Said non-ionic fluorinated surfactant addition reduce the surface tension of the ink, which in turn allows the ink to correctly spread on the surface of the substrate to be printed.

Preferably, the non-ionic fluorinated surfactant is a non-ionic polymeric ethoxylate fluorinated surfactant and/or a non-ionic polymeric acrylic fluorinated surfactant.

More preferably, the non-ionic fluorinated surfactant is selected from the group comprising Hexafor 672 (MAFLON) and Hexafor 644-D (MAFLON).

In an embodiment, the active energy ray radically curable inkjet printing ink further comprises from about 1 wt. % to about 5 wt. %, preferably from about 1.5 wt. % to about 4.5 wt. % most preferably about 2.2 wt. % to about 3.8 wt. % of one or more radically curable oligomers having a molecular weight of at least 80 g/mol, the weight percentage being based on the total weight of the active energy ray radically curable inkjet printing ink.

Said radically curable oligomers having a molecular weight of at least 80 g/mol enhance the curing and the resistance of the ink.

Preferably, said radically curable oligomers having a molecular weight of at least 80 g/mol is selected from the group consisting of tri(meth)acrylate oligomers, tetra(meth) acrylate oligomers, hexa(meth)acrylate oligomers and mixtures thereof.

More preferably, said radically curable oligomers having a molecular weight of at least 80 g/mol is one or more hexa(meth)acrylate oligomers having a molecular weight of at least 80 g/mol.

In an even more preferable embodiment, the radically curable oligomers having a molecular weight of at least 80 g/mol is Photomer Aqua 6903 (IGM).

In an embodiment, the hydroxyalkyl (meth)acrylate of iii) is a hydroxyalkyl mono(meth)acrylate monomer wherein the alkyl group is methyl, ethyl, propyl, butyl or isobutyl, preferably 4-hydroxyalkyl mono(meth)acrylate monomer wherein the alkyl group is methyl, ethyl, propyl, butyl or isobutyl, more preferably 4-hydroxybuthyl mono(meth) acrylate monomer.

In an embodiment, the active energy ray radically curable inkjet printing ink further comprises from about 0.1 wt. % to about 3 wt. %, preferably from about 0.15 wt. % to about 2.25 wt. %, most preferably from about 0.2 wt. % to about 1.5 wt. % of a second photoinitiator, the weight percentage being based on the total weight of the active energy ray radically curable inkjet printing ink.

The presence of a second photoinitiator enhance the curing of the ink.

Preferably, said second photoinitiator comprises one or more thioxanthone compounds having a molecular weight less than 400 g/mol, preferably 2-isopropylthioxanthone, 4-isopropylthioxanthone, 2,4-dimethylthioxanthone, 2,4-diethylthioxanthone, 2,4-diisopropylthioxanthone, 2-chlorothixanthone, 2-chloro-4-isopropoxythixanthone and mixtures thereof, the weight percentage being based on the total weight of the active energy ray radically curable inkjet printing ink.

More preferably, the second photoinitiator is 2-isopropylthioxanthone.

Preferably, the active energy ray radically curable inkjet printing ink has a viscosity in the range of about 0.5 to about 10 cPoises at 25° C.

The person skilled in the art is well versed in methods available to measure the viscosity of a fluid.

For the sake of example, and without wishing to be bound by such example, ink viscosity may be measured with a RHEOLOGICA VISCOTECH-(RD312), following the instructions indicated by the manufacturer.

Preferably, the active energy ray radically curable inkjet printing ink has a viscosity in the range from about 1 to about 9 cPoises, more preferably of about 2 to 8 cPoises, measured at 25° C.

The viscosity of the ink and the water amount imparts to said ink the desired reliability of the printhead during its life; which means that:
- the printhead won't exhibit significant nozzles failure, during its entire shelf-life,
- the printhead won't have significant "decap failures" during printing pauses, even higher than 3 minutes,
- the printhead will works properly at the frequencies typically needed in applications such card printing and coding and marking.

The formulation must contain only hydrosoluble or dispersible raw materials (monomers, photoinitiators, surfactants, coinitiators, etc.) in order to be stable and printable by thermal inkjet printhead.

The compositions according to the present invention may also contain other components which enable them to perform their intended purpose. These components include, but are not restricted to: stabilizers, wetting aids, slip agents, inert resins such as an acrylic polymer, antifoams, fillers, rheological aids, amine synergists, etc.

The radically curable ink described herein may further comprises one or more additional surfactants to guarantee the proper substrate wetting, lowering the surface tension of the inks.

In a preferred embodiment of the invention, any component used in the compositions according to the present invention preferably exhibit a migration of less than 10 ppb.

The migration potential of a given component is measured according to the method set forth in EFSA Guideline—Note for guidance FCM evaluation 2008.08.07.

The migration potential of a given component is measured at 60° C.

Another aspect of the invention is a printed feature consisting of a cured ink layer made from the active energy ray radically curable inkjet printing ink described hereabove.

The invention also relates to an article or document comprising a substrate and one or more printed features recited hereabove.

Typical examples of substrate include without limitation fiber-based substrates, preferably substrates based on cellulosic fibers such as paper, paper-containing materials, polymer-based materials, composite materials (e.g. substrates obtained by the lamination of paper layers and polymer films), metals or metalized materials (for example aluminum), silicon, ceramic, glasses, ceramics and combinations thereof. Typical examples of polymer-based substrates are substrates made of ethylene- or propylene-based homo- and copolymers such as polypropylene (PP) and polyethylene (PE), polycarbonate (PC), polyvinyl chloride (PVC), polyamide (PA), polymethyl methacrylate (PMMA) and polyethylene terephthalate (PET).

Preferably, the substrate of the article or document is a paper-containing material, a polymer-based material, a composite material, metal, glass, ceramic or any combinations thereof.

Another aspect of the invention is a thermal inkjet printhead comprising a printhead substrate; a nozzle layer, including a plurality of nozzles formed therethrough; a plurality of ink ejection chambers corresponding to the plurality of nozzles; a plurality of heater resistors formed on the printhead substrate and corresponding to the plurality of ink ejection chambers, each of the heater resistors being located in a different one of the ink ejection chambers so that ink drop ejection through each of the nozzles is caused by heating of one of the heater resistors that is located in the corresponding ink ejection chamber, and the active energy ray radically curable inkjet printing ink according to the invention.

Thanks to the above-mentioned printhead and the chemical properties of the developed inks, it is possible to fit well the market requirements in terms of number of printable substrates, printing velocities, flexibility in terms of printable area and reliability of the system.

Additionally, and as stated hereabove, the system has an intrinsic high reliability due to the presence of a strong amount of water in described inks which prevents the strong evaporation from the nozzles, typical in solvent-based systems.

The reactivity of the system, together with the above-mentioned chemical-physical properties of the ink, and the peculiarities of the proprietary printheads, offer a complete system that lives up to the highly demanding printing requirements of the market.

The invention also relates to a process for printing a feature on a substrate by a thermal inkjet printing process comprising the steps of:

a) applying the active energy ray radically curable inkjet printing ink according to the invention by thermal inkjet printing so as to form an ink layer, and b) exposing the ink layer to an active energy ray at a dose of at least 150 mJ/cm$^2$, to cure said ink layer with an active energy ray source.

Preferably, step a) of the process is carried out with the thermal inkjet printhead recited as described hereabove.

Preferably, the active energy ray source of step b) is a UV-LED source.

Preferably, step b) of the process consists of exposing the ink layer to one or more wavelengths between about 380 nm and about 420 nm. Typically, commercially available UV-LED sources use one or more wavelengths such as for example 365 nm, 385 nm, 395 nm and 405 nm.

Preferably, the velocity range of the process is comprised between about 0 to about 60 m/min.

The velocity range is measured at ambient temperature.

Preferably, the drying time range of the process is comprised between about 0.02 sec and about 1 sec, more preferably between about 0.07 sec and about 0.44 sec.

In an embodiment of the invention, the printing frequency is higher than about 7 KHz. In a preferred embodiment, the printing frequency is higher than about 8 KHz. More preferably, the printing frequency is higher than about 9 KHz.

In an embodiment of the process, the ink layer made of the active energy ray radically curable inkjet printing ink is transparent and wherein said ink is at least partially applied in the form of one or more indicia on a printed feature.

The process described herein is particularly suitable for producing one or more printed features on a substrate, wherein said one or more printed features may be continuous or discontinuous.

These and other objects, advantages, and features of the invention will become apparent to those persons skilled in the art upon reading the details of the methods and formulations as more fully described below.

EXAMPLES

The present invention is now described in more details with reference to non-limiting examples.

A. Inks According to the Invention

Several inks were formulated according to the directions of the invention: E1-E5 Compositions of these inks are disclosed hereunder.

TABLE 1

Composition of water-based inks

| Raw materials | Wt. % | | | | |
|---|---|---|---|---|---|
| Name | E1 | E2 | E3 | E4 | E5 |
| PEG Diacrylate n = 10 (ALDRICH) | 9.76 | 7 | 9.76 | 9.76 | 9.76 |
| 4-Hydroxybuthyl acrylate (ALDRICH) | 4 | 7 | 4 | 4 | 4 |
| LFC 3587 (IGM) | 3 | 3 | 3 | 3 | 3 |
| Photomer Aqua 6903 (IGM) | | 3 | | | |
| ITX Omnirad ITX (IGM) | | | | | 0.5 |
| N-[3-(Dimethylamine)propyl]-metacrylamide (ALDRICH) | 0.98 | 0.98 | | 0.48 | |
| Poly(methylhydrosiloxane) (ALDRICH) | | | 0.98 | | 0.98 |
| Hexafor 672 (MAFLON) | 1 | | 1 | 1 | 1 |

TABLE 1-continued

Composition of water-based inks

| Raw materials | Wt. % | | | | |
|---|---|---|---|---|---|
| Name | E1 | E2 | E3 | E4 | E5 |
| Hexafor 644-D (MAFLON) | | 0.30 | | | |
| KP-BK904UV pigment (INKGENIO) | 8.13 | | 8.13 | 8.13 | 8.13 |
| Water | 73.13 | 78.72 | 73.13 | 73.63 | 72.63 |

Ink Preparation

All the chemical compounds used for this work are commercially available and have been used as received, without further purification treatments.

In a glass vessel containing a magnetic stir bar, the raw materials were introduced at room temperature in the following sequence: monomers, water, surfactant, co-initiator, photoinitiator, dyes/pigments. Subsequently, the so-obtained mixture was stirred at room temperature for 45-60'. The solution was then filtered, and the filtrate was introduced inside the printheads under vacuum conditions. Filtration was carried out using Versapore filters with porous size diameter among 0.3-3.0 μm. The so-obtained inks were introduced in the printheads by the inking machine (Xynertech semi-automatic filling system).

Colored inks were prepared as well, using the same process, with the following composition.

TABLE 2

Composition of colored water-based inks

| Raw materials | Wt. % | | |
|---|---|---|---|
| Name | E6 (cyan) | E7 (yellow) | E8 (magenta) |
| Water | 69.29 | 69.25 | 69.29 |
| KP-CY901UV (INKGENIO) | 8.08 | | 0.00 |
| KP-YE903UV (INKGENIO) | | 8.09 | 0.00 |
| KP-MA902UV (INKGENIO) | | | 8.08 |
| PEG Diacrylate n = 10 (ALDRICH) | 9.70 | 9.71 | 9.70 |
| γ-Butyrolactone (ALDRICH) | 3.00 | 3.00 | 3.00 |
| 4-Hydroxybuthyl acrylate (ALDRICH) | 3.98 | 3.98 | 3.98 |
| Hexafor 672 (MAFLON) | 0.99 | 1.00 | 0.99 |
| LFC3587 (IGM) | 2.98 | 2.99 | 2.98 |
| Omnirad ITX (IGM) = 2-isopropylthioxanthone | 1.00 | 1.00 | 1.00 |
| Poly(methylhydrosiloxane) (ALDRICH) | 0.97 | 0.98 | 0.97 |

B. Comparative Inks

Inks of the invention were compared to the following inks, prepared according to the prior art, to assess whether or not they reach at least the same chemical, mechanical and technological performances of the solvent-based UV inks once printed and UV crosslinked.

TABLE 3

Composition of comparative inks

| Raw materials | Wt. % | | | |
|---|---|---|---|---|
| Name | C1 | C2 | C3 | C4 |
| PEG Diacrylate n = 10 (ALDRICH) | 6.83 | 9.76 | 10 | 9.76 |
| LFC 3587 (IGM) | 0.98 | 3 | 3 | 0.98 |
| Photomer Aqua 6903 (IGM) | 2.93 | | | |
| N-[3-(Dimethylamine)propyl]methacrylamide (ALDRICH) | 0.98 | 0.98 | 3 | 0.98 |
| Surfynol 465 (EVONIK) | 0.88 | | | 0.88 |

TABLE 3-continued

Composition of comparative inks

| Raw materials | Wt. % | | | |
|---|---|---|---|---|
| Name | C1 | C2 | C3 | C4 |
| Hexafor 672 (MAFLON) | | 1 | | |
| Hexafor 644-D (MAFLON) | | | 0.30 | |
| Water Black R510 (ORIENT) | 2.44 | | | |
| Cab-O-Jet 250C pigment (CABOT) | | 0.62 | | 2.44 |
| Cab-O-Jet 270Y pigment (CABOT) | | 0.62 | | |
| Cab-O-Jet 465M pigment (CABOT) | | 1.20 | | |
| Water | 84.96 | 82.82 | 83.70 | 84.96 |

C. Comparison

Inks were tested on several criteria indicative of the prerequisites expected to fit the market requirement. Among them:

The reached reticulation degree, after the curing process, must be high.

Viscosity must be sufficient to low enough to ensure a proper ejectability of the ink.

The UV water-based ink formulations contain components studied to impart to the polymer high adhesion to a huge number of printable materials.

Mechanical durability of UV water-based inks is also mandatory; tests have been carried out to evaluate their adhesion performances on printed surfaces.

TABLE 4

Comparison of inks of the invention (E) and comparative inks (C)

|   | Formulation | Energy to guarantee cross-linking ≥70% (FTIR mJ/cm²) | Rub test at cross-linking ≥70% (ΔE) | Viscosity (mPa · s) | Surface Tension (mN/m) | Taber test (cycles/μm) | Water resistance | Critical issue |
|---|---|---|---|---|---|---|---|---|
| E | E1 | 575 | 9.75 | 3.58 | 28.08 |  | OK |  |
|   | E2 | 211 |  | 2.581 | 24.98 | 6-8 | OK |  |
|   | E3 | 400 | 11.27 | 3.14 | below instrument detectability |  | OK |  |
|   | E4 | 575 | 9.13 | 3.269 | 26.44 |  | OK |  |
|   | E5 | 109 | 7.69 | 3.166 | 18.22 |  | OK |  |
| C | C1 | 575 | 16.34 | 2.183 | 34.40 |  | KO | Poor water resistance |
|   | C2 | 211 | 9.71 | 3.801 | below instrument detectability |  | OK | Color instability of ink in time |
|   | C3 | 780 |  | 2.03 | 23.93 |  | non perfect water resistance | Poor water and mechanical resistance |
|   | C4 | 780 | 14.25 | 1.985 |  |  | OK | High cross-linking energy |

Printing Tests

The printhead types used during the printing tests were single ink printheads and multiple inks printheads. The printing tests have been performed using Card printer FARGO INK1000 and Neopost printer system. Curing was carried out with the commercially available UV lamp Phosen FJ100 (16W) at a distance of 4 mm, an emission wavelength of 395 nm, window dimensions of 2×7.5 cm and with 60 m/min speed of the belt (for "in dynamic" printing tests, colored inks) and by an internal developed UV lamp (for "in static" printing tests, transparent inks). The energy values furnished by irradiation have been measured by the UV-Design radiometer UV-MC Microprocessor Integrator. The cross-linking degree of formulate.ons after printing and irradiation has been determined by FTIR measurements using the Nicolet spectrometer FT-IR Nexus.

General Experimental Procedure ("in Dynamic" Printing Tests):

A single ink printhead containing the desired formulation is introduced in the Neopost printer system. The substrate is positioned at the top of a conveyor belt whose speed can be regulated.

The substrate reaches the printhead station (where printing occurs) and the UV lamp (where it is irradiated). Finally, the printed media is recovered.

General Experimental Procedure ("in Static" Printing Tests):

A multiple inks printhead containing the desired formulation is introduced in the Card printer FARGO INK1000. A card is charged in the machine and is warmed to the desired temperature. The card is then printed and irradiated "in static" by a UV lamp. After the irradiation treatment the card is ejected by the printer.

Crosslinking Measurement Process

Evaluation of the conversion degree of the material, measured by FTIR spectroscopic analysis. The FTIR instrument measures the typical monomer signal. The reaction of the monomers is monitored by observing the infrared vibration peak connected to the acrylate functionality disappearing, as a function of the UV energy dose.

Chemical Resistance Test Process

The chemical resistance evaluation is carried out by immersing the samples in water for 24 hours. If the printed ink is unaltered the test is OK. The water resistance is KO when, after immersion, the cured ink is removed. If the cured ink is not removed by water but is altered anyway, the ink is deemed to have a non-perfect water resistance.

Viscosity Method Process

The inks viscosity is measured with the RHEOLOGICA VISCOTECH-(RD312) tool, equipped with a thermostatic bath to maintain the correct temperature of the ink (25° C.), during the measure.

The viscosity measure was carried out as reported below:
deposit an ink volume of 0.925 ml on the temperature-controlled plate, with a graduate pipette, taking care not to create air bubbles,
start the measurement via software: the head of the viscosimeter lowers and, once the coupling of the rotating plate with the thermostated base is reached, the plate begins to rotate for some seconds,
the ink's creep resistance measurement, or viscosity, is expressed in mPa*s (same as Cpoise).

Surface Tension Method Process

The inks surface tension is measured with the KRUSS K12-(RD337) TENSIOMETER tool, equipped with a thermostatic bath to maintain the temperature desiderata of the ink, during the measure.

The surface tension measurement is carried out as reported below:
washing the platinum plate with hydrochloric acid 37% and then, with deionized water,
heat the platinum plate using the Bunsen flame,
fill up to two-thirds of the glass cup with the ink,
insert the glass cup in his proper slot to allow the ink thermostating,
get the glass cup close enough to the platinum plate (with appropriate knobs), so that the ink surface graze the inferior limit of the plate,
start the measure by the instrument,
the surface tension measurement is reported on the tool display and is expressed in Dyne/cm.

Taber Test

The Taber test results refer to the number of abrasion cycles required to reach the stopping point for each ink tested. The stopping point is reached for the 50% reduction of the initial optical density measurement (ANSI INCITS 322-2008, Card Durability Test Methods).

Samples preparation: the samples are prepared printing PVC cards at the temperature of 70° C. with the printing mode 16 layers (smart shingling printing mode) and by UV irradiation during the print.

The rub test and abrasion resistance are carried out with colored inks and clear ink, respectively. The Crock-meter tool is used to evaluate the rub resistance: cured inks on aluminum sheet are rubbed with a piece of cotton textile, for 100 times (without any weight in arm's addition). Evaluations are carried out measuring the colorimetric coordinates variations and they are expressed by ΔE values.

The thickness deposed on the surface could be between 1 and 50 μm as a function of the abrasion resistance desired and can be measured with mechanical profilometer (TENCOR) or with an optical microscope.

D. Colored Inks

Colored inks of the invention (E6-E8) were prepared, and tests were run to assess their capacity to cure.

The minimum energy dose required to give to the three colored inks a conversion degree equals or higher than 70% is at least 50 mJ/cm2.

Additional properties are reported in the following table:

TABLE 5

Properties of colored water-based inks

|    | Viscosity (mPa*s) | Surface Tension (mN/m) | Taber (n° of cycles) | Smudge test (ΔE) | Water and Ethanol resistance |
|----|-------------------|------------------------|----------------------|------------------|------------------------------|
| E6 | 6.463             | 22.69                  | 250                  | 2.05             | OK                           |
| E7 | 4.957             | 23.71                  | 200                  | 2.47             | OK                           |
| E8 | 3.423             | 23.13                  | 400                  | 5.45             | OK                           |

Smudge Test

The smudge test results refer to the colorimetric variation of samples after 100 rubs with a weight of 500 gr on the crock-meter tool arm, expressed by ΔE values.

Samples preparation: the samples are prepared using a higher ink amount (>18% weight than the smart shingling mode) with the printing mode 4 layers at 700° C. by 4 passages under UV lamp after the print.

E. Additional Tests

To complete the comparison of the inks according to the invention and those of the prior art, additional tests were performed.

Other Phosphine Oxide

C5-C6 are based on E3, with the exception that IRGACURE® 819 (Phenylbis(2,4,6-trimethylbenzoyl)phosphine oxide) has been used instead of LFC 3587. Exact composition is presented hereunder.

TABLE 6

Composition of a water-based ink comprising different phosphine oxide

| Raw materials | Wt. % | |
|---|---|---|
| Name | C5 | C6 |
| PEG Diacrylate n = 10 (ALDRICH) | 9.76 | 9.76 |
| 4-Hydroxybuthyl acrylate (ALDRICH) | 4 | 4 |
| LFC 3587 (IGM) | | |
| IRGACURE ® 819 (BASF) | 3 | 3 |
| Poly(methylhydrosiloxane) (ALDRICH) | 0.98 | |
| Hexafor 672 (MAFLON) | 1 | 1 |

TABLE 6-continued

Composition of a water-based ink comprising different phosphine oxide

| Raw materials | Wt. % | |
|---|---|---|
| Name | C5 | C6 |
| KP-BK904UV pigment (INKGENIO) | 8.13 | 8.13 |
| Water | 73.13 | 74.11 |

E3 was then tested against these C5 and C6 inks according to their capacity to crosslink under UV light.

The resulting comparative inks exhibited very poor curing performances.

TABLE 7

Comparison of inks differing by the nature of phosphine oxide used

|    | UV energy dose (mJ/cm²) | Cross-linking degree |
|----|-------------------------|----------------------|
| E3 | 400                     | ≥70%                 |
| C5 | 350                     | 19%                  |
| C6 | 625                     | 2%                   |

The test was repeated with lithium phenyl-2,4,6-trimethylbenzoylphosphinate been used of instead of LFC3587.

Lithium phenyl-2,4,6-trimethylbenzoylphosphinate ("LAP") has the following formula:

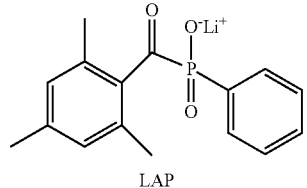

LAP

TABLE 8

Composition of a water-based ink comprising LAP instead of LFC3587

| Raw materials | C7 |
|---|---|
| Water | 72.63 |
| KP-BK904UV (Ink-Genio) | 8.13 |
| PEG Diacrylate n = 10 (ALDRICH) | 9.76 |
| 4-Hydroxybuthyl acrylate (ALDRICH) | 4.00 |
| Hexafor 672 (Maflon) | 1.00 |
| Lithium phenyl-2,4,6-trimethyl-benzoylphosphinate (Aldrich) | 3.00 |
| Omnirad ITX (IGM) | 0.50 |
| Poly(methylhydrosiloxane) (Aldrich) | 0.98 |

The cross-linking degrees after UV irradiation for the comparative ink is completely unsatisfying.

The conversion degree of the acrylate functionalities is lower than 50% despite of the high UV energy amount used to photocrosslink the ink (1000 mJ/cm2).

Triethanolamine Instead of Claimed Co-Initiator

In order to evaluate the performances of triethanolamine in the water-based formulations of the invention, a new ink (C8) has been prepared. This ink is similar to E5 but contains triethanolamine instead of polymethylhydrosiloxane (used in E5 at the same percentage value.

TABLE 9

| | Comparison of co-initiators | | |
|---|---|---|---|
| | UV energy dose (mJ/cm$^2$) | Cross-linking degree | Water resistance |
| E5 | 109 | ≥70% | OK |
| C8 | 602 | 56% | Very poor |

Other Thioxanthone

Similar inks as E6-E8 with the exception that 0.5 wt. % of Omnipol TX (polymeric thioxanthone photoinitiator) have been used instead of 1.0 wt. % Omnirad ITX. The resulting comparative inks exhibited very poor curing performances.

Acrylates with a Number of Ethylene Oxide Group Inferior to 5

In order to evaluate the possibility to use diacrylates having smaller n value than 5, 3 colored inks containing a diacrylate having MW=258 g/mol (n=3) have been prepared.

TABLE 10

Composition of inks comprising acrylates with a number of ethylene oxide group inferior to 5

| Raw materials | Wt. % | | | |
|---|---|---|---|---|
| Name | C9 (cyan) | C10 (magenta) | C11 (yellow) | C12 |
| PEG Diacrylate MW 258 (ALDRICH) | 9.7 | 9.7 | 9.7 | 9.7 |
| 4-Hydroxybuthyl acrylate (ALDRICH) | 3.98 | 3.98 | 3.98 | 3.98 |
| LFC 3587 (IGM) | 2.98 | 2.98 | 2.99 | 2.99 |
| Isopropyl thioxanthone (IGM) | 1 | 1 | 1 | 1 |
| Poly(methylhydrosiloxane) (ALDRICH) | 0.97 | 0.97 | 0.98 | 0.98 |
| Hexafor 672 (MAFLON) | 0.99 | 0.99 | 0.99 | 0.99 |
| γ-butyrolactone (ALDRICH) | 3 | 3 | 3 | 3 |
| KP-CY901UV (Ink-Genio) | 8.08 | 0 | 0 | 0 |
| KP-YE903UV (Ink-Genio) | 0 | 0 | 6.62 | 0 |
| KP-MA902UV (Ink-Genio) | 0 | 5 | 0 | 0 |
| Water | 69.29 | 72.37 | 70.75 | 77.36 |

After 2 days of storage at room temperature into glass jars, inks have been checked for precipitation of some component. The precipitation is particularly well visible for C9 (Cyan), quite well visible for C10 (Magenta) C10 and a little bit visible for C11 (Yellow). The precipitation also occurs in the transparent formulation C12.

Migration Test Experiments

The aim of migration experiments is to evaluate, according to the European standards, if the molecule ITX (which is the lower molecule from a point of view of the molecular weight) doesn't migrate through the printed substrate.

ITX molecule, due to its chemical behavior typical for a Type II photoinitiator maintains its molecular structure after the UV irradiation without undergoing any photocleavage and chemical bonding to the polymeric macromolecule, rendering it apt to migrate out of the cured layer.

For this reason, the composition has been studied in depth to assess the migrating value of ITX. The migration of these substrates has been evaluated in set-off condition after storage of the cured samples in contact with 95% ethanol and 10% ethanol as simulating fluids during ten days at 60° C.

The experiments are carried out in accordance with the EFSA Guidelines (EFSA Guideline—Note for guidance FCM evaluation 2008.08.07).

Analytical Method

The analytical method allows, by using of U-HPLC Technique, to check and quantify in simulating fluids.

The detection limit is the total amount detected of photoinitiator detected in the simulated fluids, expressed in ppb. The detection limit for Omnirad ITX is 10 ppb.

Following the printed substrates prepared using a UV lamp Phoseon FJ-100:

TABLE 11

Samples for migration tests

| Sample | Ink | Substrate | Substrate speed | Lamp/substrate distance | File resolution |
|---|---|---|---|---|---|
| 1 | E3 | PET | 20 m/min | 2 mm | 600 × 300 dpi |
| 2 | E3 | Aluminum foil | 20 m/min | 2 mm | 600 × 300 dpi |
| 3 | E5 | PET | 20 m/min | 2 mm | 600 × 300 dpi |
| 4 | E5 | Aluminum foil | 20 m/min | 2 mm | 600 × 300 dpi |
| 5 | E5 | Aluminum foil | 40 m/min | 2 mm | 300 × 300 dpi |
| 6 | E5 | PET | 40 m/min | 2 mm | 300 × 300 dpi |
| 7 | E5 | Aluminum foil | 20 m/min | 2 mm | 600 × 300 dpi (QRcode) |
| 8 | E5 | PET | 20 m/min | 2 mm | 600 × 300 dpi (QRcode) |
| 9 | | Blank PET | | | |
| 10 | | Blank Aluminum foil | | | |

Migration Test Conditions

The specific migration of the photoinitiator is measured in indirect contact (set off). For test in indirect contact, the surface of each cured sample, is pressed with 20 Kg (196 N) onto the unprinted substrate, for 10 days at room temperature.

After set-off the substrates were cut with the following dimensions:

total surface=2.54 cm×2.54 cm=6.45 cm2.

Each sample is cut from a different coated foil with a cutter.

Ratio surface/volume: 0.6 cm$^2$/ml (according to EFSA Guideline that requests the ratio surface/volume between 0.5-2).

Each sample is placed into a vial (20 ml) in contact with 10 ml exactly measured of simulating fluids: Ethanol 95% and Ethanol 10%.

The sample is completely covered, and stored in dark condition into a water thermostatic bath for 10 days at 60° C.

Each vial is securely closed to avoid evaporation of the simulating fluid and suitably labelled.

After the storage, each vial is cooled at room temperature and the simulating fluid after filtration is transferred into a clean vial (20 ml).

Also, a standard substrate (not printed) is kept in contact with the simulating fluid at the same conditions to obtain a blank solution.

All migration tests are done in duplicate.

Each sample of simulating fluid is analyzed by UHPLC with a UV Diode array and MS single quad detector.

The results are expressed as ppb in simulating fluid.

The analysis of each sample is done in triplicate.

Results for Blank Samples

The summary of the analytical results (mean values on 3 samples) together with the identification of the samples are reported in the following table 12. The results are expressed in ppb content in both simulating fluids.

TABLE 12

| Blank samples results | |
|---|---|
| Simulating fluid: Ethanol 95% and Ethanol 10% Storage condition: 10 days 60° C. - SET OFF | Omnipol ITX (ppb) |
| Et-OH 95% + PET | under detection limit |
| Et-OH 95% + Aluminium | under detection limit |
| Et-OH 95% | under detection limit |
| Et-OH 10% + PET | under detection limit |
| Et-OH 10% + Aluminium | under detection limit |
| Et-OH 10% | under detection limit |

TABLE 13

| Indirect contact samples (set-off) | |
|---|---|
| Simulating fluid: Ethanol 95% Storage condition: 10 days at 60° C. - SET OFF | Omnirad ITX ppb |
| E3 PET - 20 m/min-2 mm-File600 × 300 - Set-off | under detection limit |
| E3 Aluminum foil - 20 m/min-2 mm-File600 × 300 Set-off | under detection limit |
| E5 PET - 20 m/min-2 mm-File600 × 300 - Set-off | under detection limit |
| E5 Aluminum foil - 20 m/min-2 mm-File600 × 300 Set-off | under detection limit |
| E5 Aluminum foil - 40 m/min-2 mm-File300 × 300- Set-off | under detection limit |
| E5 PET - 40 m/min-2 mm-File300 × 300- Set-off | under detection limit |
| E5 Aluminum foil - 20 m/min-2 mm-File600 × 300- QRcode- Set-off | under detection limit |
| E5 PET - 20 m/min-2 mm-File600 × 300-Qrcode- Set-off | under detection limit |

TABLE 14

| Indirect contact samples (set-off) | |
|---|---|
| Simulating fluid: Ethanol 95% Solution in water at 10% concentration. Storage condition: 10 days at 60° C. - SET OFF | Omnirad ITX ppb |
| E3 PET- 20 m/min-2 mm-File600 × 300 - Set-off | under detection limit |
| E3 Aluminum foil - 20 m/min-2 mm-File600 × 300 Set-off | under detection limit |
| E5 PET - 20 m/min-2 mm-File600 × 300 - Set-off | under detection limit |
| E5 Aluminum foil - 20 m/min-2 mm-File600 × 300 Set-off | under detection limit |
| E5 Aluminum foil - 40 m/min-2 mm-File300 × 300- Set-off | under detection limit |
| E5 PET - 40 m/min-2 mm-File300 × 300- Set-off | under detection limit |
| E5 Aluminum foil - 20 m/min-2 mm-File600 × 300- QRcode- Set-off | under detection limit |
| E5 PET -20 m/min-2 mm-File600 × 300-Qrcode- Set-off | under detection limit |

As a conclusion, it was found that ITX has a migrating value under the accepted limit of 10 ppb.

Also, LFC3587 is not detected at values higher than the detection limit of the analytical instrument used. This is more predictable due to the chemical behavior of this Type I photoinitiator, which undergoes photocleavage once UV irradiated and the chemical subproducts, which are the initiators, remains chemically bonded to the macromolecule.

The exemplary black ink formulations (E3 and E5) are both suitable for Pharma and Coding/marking applications as well as in food and beverage field, as they have passed positively migration tests according to the European standards.

The cured inked also presented humidity resistance, as the printed images are still readable after storage at −15° C. and 4° C. and after thermal cycles between these two temperatures and room temperature.

The cured inked also exhibited high light fastness (outdoor test executed with Sun test instrument XXL+ with Xenon lamps) equivalent to direct sun light exposure for 3 years.

Sun Test Method:

Measure the samples' Optical Density with reflection densitometer (ANSI STATUS 1): GretagMacbeth DensyEye700

Expose the samples at the Xenon lamps for 12 days without window filter (intensity of the illumination: 0.35 watts/m2 at the card surface at 340 nm, test chamber temperature: 50° C.±5° C.) Final optical density measurement: the final evaluation is carried out measuring the percentage loss of optical density. The outdoor exposure final evaluation is carried out considering the following range of % loss of optical density.

TABLE 15

| Sun test | |
|---|---|
| Value of x | Comment |
| x > 50% | different color |
| 40% < x < 50% | strong color difference |
| 25% < x < 40% | quite noticeable variance |
| 10% < x < 25% | noticeable but smooth variance color |
| 5% < x < 10% | very small color difference |

Colored inks' sun test results are all good with a loss % of OD equal or lower than 15%.

Black inks sun test results are also good with a loss % of OD between 0% and 10%.

In light of the tests previously presented, it will be readily apparent to the person skilled in the art that the developed formulations, cured with the lamp, guarantee the following requirements:

High crosslinking density,
High conversion degree (% of covalent bonds formation),
High adhesion to the printed surfaces (papers, plastics, metals),
High chemical resistance to water and ethanol,
High rub and abrasion resistance,
High sun-test resistance.

The developed formulation thus reaches the performances of solvent-based UV inks.

The Exemplary formulations (black and colored) satisfy the above-mentioned requirements and in particular, black inks formulation are also compatible with food and beverage applications.

F. Printhead According to the Invention

Figure 1B:
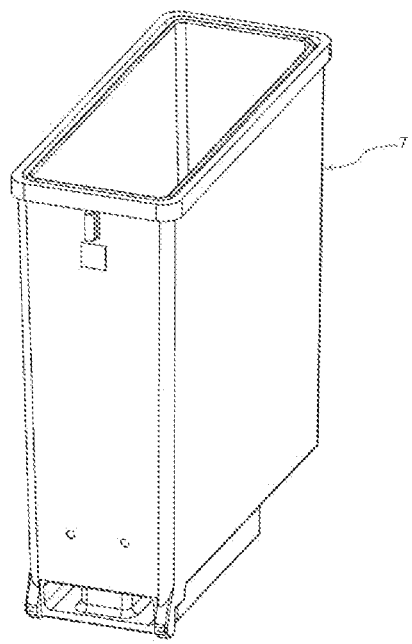

The invention also relates to a printhead cartridge configured to be used with inks described hereabove. Such a printhead cartridge, shown in FIG. 1A, is made of a printhead ejection assembly 1, constituted by a printhead chip 2 bonded to a flexible printed circuit 3. The chip houses the electrical and hydraulic components to address the ink towards the various ejecting sites, energizing it on demand, to produce ink droplets for printing. A nozzle plate is applied on the top surface of the chip, to provide the nozzles for ink ejection. The whole ejection assembly is in turn bonded to a cartridge 4, that contains the ink reservoir, closed by a lid 5. Suitable ink slot 6 are obtained in the cartridge body 7 illustrated in FIG. 1B, to allow the ink to get the printhead chip and to arrive to the microfluidic circuit, either through the slot 8 machined into the chip or from the chip edge, depending on the printhead layout.

Figure 2A:
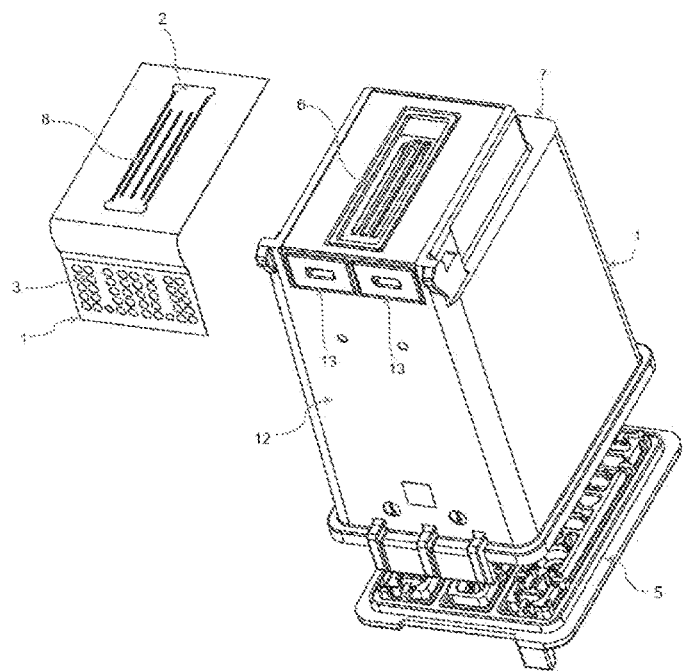
FIGS. 2A and 2B are schematic representations of a multiple ink printhead cartridge compatible with the active energy ray radically curable inkjet printing ink of the invention.

In a multiple ink printhead cartridge, shown in FIG. 2A, there are of course multiple ink reservoirs and multiple ink paths towards the printhead. They have hydraulically insulated each other, to prevent inks from mixing. Since the cartridge is made assembling different parts and materials, the joints between components must ensure not only a good bonding, but also a perfect and long-lasting ink sealing in the regions that are in contact with the ink. There are many ways to bond different materials: the use of a suitable glue has many advantages, provided that it can be dispensed accurately in the bonding region. For example, a suitable glue could be dispensed onto the flat surface around the flow paths 6 in the body, to ensuring its bonding with chip and also a good sealing around the lower surface of the slots 8 in the chip. In such a way, the inks can flow from the reservoir towards the chip, without any mixing or leakage.

Figure 2B:
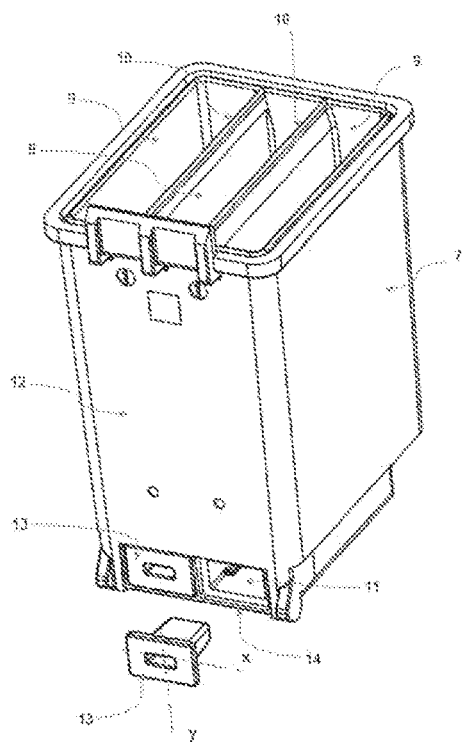

Moreover, the cartridge body of a multiple inks printhead requires a special manufacturing process: for example, in a three inks cartridge with parallel nozzle arrays, the casting techniques don't allow to get a piece at once with a single molding process: in more details, as shown in FIG. 2B, the cartridge body 7 has three ink reservoirs 9, divided by the walls 10. Due to the small lateral distance between the different color nozzle arrays, it is not possible to produce three separate straight ink paths, maintaining the necessary hydraulic characteristics and the suitable structure robustness. A possible solution is the use of two additional parallel slide inserts to produce the desired fluidic structure inside the cartridge body (as described in the patent EP 189622 B1). Once completed the casting process, the extraction of the two slide inserts leaves two windows 11 in the side surface 12 of the cartridge: these windows must be closed with suitable plugs 13, conveniently bonded to the cartridge.

The downward vertical axis y in the figure corresponds to the ink ejecting direction for the printhead. A possible way to bond the plugs is the use of a glue, dispensed along the flat recessed surface 14 of the window boundary. This ensures the tight sealing of the openings, without allowing the ink to leak out from the reservoir. Due to the front flange of plugs and the corresponding recess in the cartridge body, a UV curable glue isn't adequate for the sealing purpose. The glue wouldn't be efficiently lighted by UV radiation in a poor polymerization degree and low bonding and sealing performances.

With reference to the electric control, the printheads are regulated by C-MOS technology. This technology is more expensive than the previous technology used, but it is more powerful. Specific tools give an improvement about the logic control of the printhead and his piloting is possible with a significant energy saving. C-MOS technology permits a large design freedom and allows more complex electronic integration on the chip, reducing the space and the energy consumption.

Contemporary, thanks to the reactivity of the system, together with the above-mentioned chemical-physical properties of the ink, and the peculiarities of the proprietary printheads, the complete system lives up to the highly demanding printing requirements.

In any case, the invention cannot and should not be limited to the embodiments specifically described in this document, as other embodiments might exist. The invention shall spread to any equivalent means and any technically operating combination of means.

The invention claimed is:

1. An active energy ray radically curable inkjet printing ink comprising:
   i) at least 55 wt. % of water
   ii) from about 2 wt. % to about 20 wt. % of a radically curable di(meth)acrylate monomer being a polyethylene glycol di(meth)acrylate having 5 or more ethylene oxide groups per molecule;
   iii) from about 1 wt. % to about 15 wt. % of a radically curable (meth)acrylate compound being a hydroxyalkyl (meth)acrylate wherein the alkyl group is methyl, ethyl, propyl, butyl or isobutyl;
   iv) from about 1 wt. % to about 5 wt. % of a photoinitiator of formula (I):

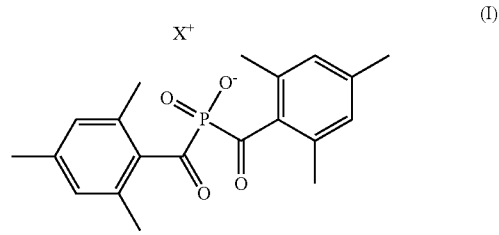

wherein $X^+$ is $Na^+$ or $Li^+$,
   v) from about 0.1 wt. % to about 2 wt. % of one or more co-initiator selected from the group consisting of N-[3-(dimethylamine)propyl]metacrylamide and/or poly(m-ethylhydrosiloxane);
   the weight percentage being based on the total weight of the active energy ray radically curable inkjet printing ink.

2. The active energy ray radically curable inkjet printing ink according to claim 1, wherein the radically curable di(meth)acrylate monomer being a polyethylene glycol di(meth)acrylate having 5 or more ethylene oxide groups per molecule has a molecular weight comprised between about 300 and about 600 g/mol.

3. The active energy ray radically curable inkjet printing ink according to claim 1, further comprising from about 1.0 wt. % to about 15 wt. % of a coloring agent, the weight percentage being based on the total weight of the active energy ray radically curable inkjet printing ink.

4. The active energy ray radically curable inkjet printing ink according to claim 1, further comprising from about 0.05 wt. % to about 2 wt. % of a non-ionic fluorinated surfactant, the weight percentage being based on the total weight of the active energy ray radically curable inkjet printing ink.

5. The active energy ray radically curable inkjet printing ink according to claim 1, wherein hydroxyalkyl (meth) acrylate of iii) is a hydroxyalkyl mono(meth)acrylate monomer wherein the alkyl group is methyl, ethyl, propyl, butyl or isobutyl.

6. The active energy ray radically curable inkjet printing ink according to claim 1, further comprising from about 0.1 wt. % to about 3 wt. % of a second photoinitiator the weight percentage being based on the total weight of the active energy ray radically curable inkjet printing ink, said second photoinitiator comprising one or more thioxanthone compounds having a molecular weight less than 400 g/mol.

7. The active energy ray radically curable inkjet printing ink according to claim 1, having a viscosity in the range from about 0.5 to about 10 cPoises at 25° C.

8. A printed feature consisting of a cured ink layer made from the active energy ray radically curable inkjet printing ink recited in claim 1.

9. An article or document comprising a substrate and one or more printed features recited in claim 8.

10. The article or document according to claim 9, wherein the substrate is a paper-containing material, a polymer-based material, a composite material, metal, glass, ceramic or any combinations thereof.

11. A thermal inkjet printhead comprising a printhead substrate; a nozzle layer, including a plurality of nozzles formed therethrough; a plurality of ink ejection chambers corresponding to the plurality of nozzles; a plurality of heater resistors formed on the printhead substrate and corresponding to the plurality of ink ejection chambers, each of the heater resistors being located in a different one of the ink ejection chambers so that ink drop ejection through each of the nozzles is caused by heating of one of the heater resistors that is located in the corresponding ink ejection chamber; and the active energy ray radically curable inkjet printing ink to claim 1.

12. A process for printing a feature on a substrate by a thermal inkjet printing process comprising the steps of:

a) applying the active energy ray radically curable inkjet printing ink recited in claim 1 by thermal inkjet printing so as to form an ink layer, and b) exposing the ink layer to an active energy ray at a dose of at least 150 mJ/cm$^2$, to cure said ink layer with an active energy ray source.

13. The process of claim 12, wherein the step a) is carried out with a thermal inkjet printhead comprising a nozzle layer, including a plurality of nozzles formed therethrough; a plurality of ink ejection chambers corresponding to the plurality of nozzles; a plurality of heater resistors formed on the printhead substrate and corresponding to the plurality of ink ejection chambers, each of the heater resistors being located in a different one of the ink ejection chambers so that ink drop ejection through each of the nozzles is caused by heating of one of the heater resistors that is located in the corresponding ink ejection chamber; and the active energy ray radically curable inkjet printing ink.

14. The process according to claim 12, wherein step b) consists of exposing the ink layer to one or more wavelengths between about 380 nm and about 420 nm.

15. The process according to claim 12, wherein the ink layer made of the active energy ray radically curable inkjet printing ink is transparent and wherein said ink is at least partially applied in the form of one or more indicia on a printed feature.

16. The active energy ray radically curable inkjet printing ink according to claim 1, wherein the radically curable (meth)acrylate compound is hydroxyalkyl (meth)acrylate and the alkyl group is methyl, ethyl, propyl, butyl or isobutyl, and wherein X$^+$ is Na$^+$.

17. The active energy ray radically curable inkjet printing ink according to claim 4, wherein the non-ionic fluorinated surfactant is a non-ionic polymeric ethoxylate fluorinated surfactant and/or a non-ionic polymeric acrylic fluorinated surfactant.

18. The active energy ray radically curable inkjet printing ink according to claim 5, wherein hydroxyalkyl (meth) acrylate of iii) is a 4-hydroxyalkyl mono(meth)acrylate monomer wherein the alkyl group is methyl, ethyl, propyl, butyl or isobutyl.

19. The active energy ray radically curable inkjet printing ink according to claim 5, wherein hydroxyalkyl (meth) acrylate of iii) is a 4-hydroxybuthyl mono(meth)acrylate monomer.

20. The active energy ray radically curable inkjet printing ink according to claim 6, wherein the one or more thioxanthone compounds are selected from the group consisting of 2-isopropylthioxanthone, 4-isopropylthioxanthone, 2,4-dimethylthioxanthone, 2,4-diethylthioxanthone, 2,4-diisopropylthioxanthone, 2-chlorothixanthone, 2-chloro-4-isopropoxythixanthone and mixtures thereof.

* * * * *